(No Model.)
T. F. MEATH.
BALE ELEVATOR.
No. 569,976. Patented Oct. 20, 1896.
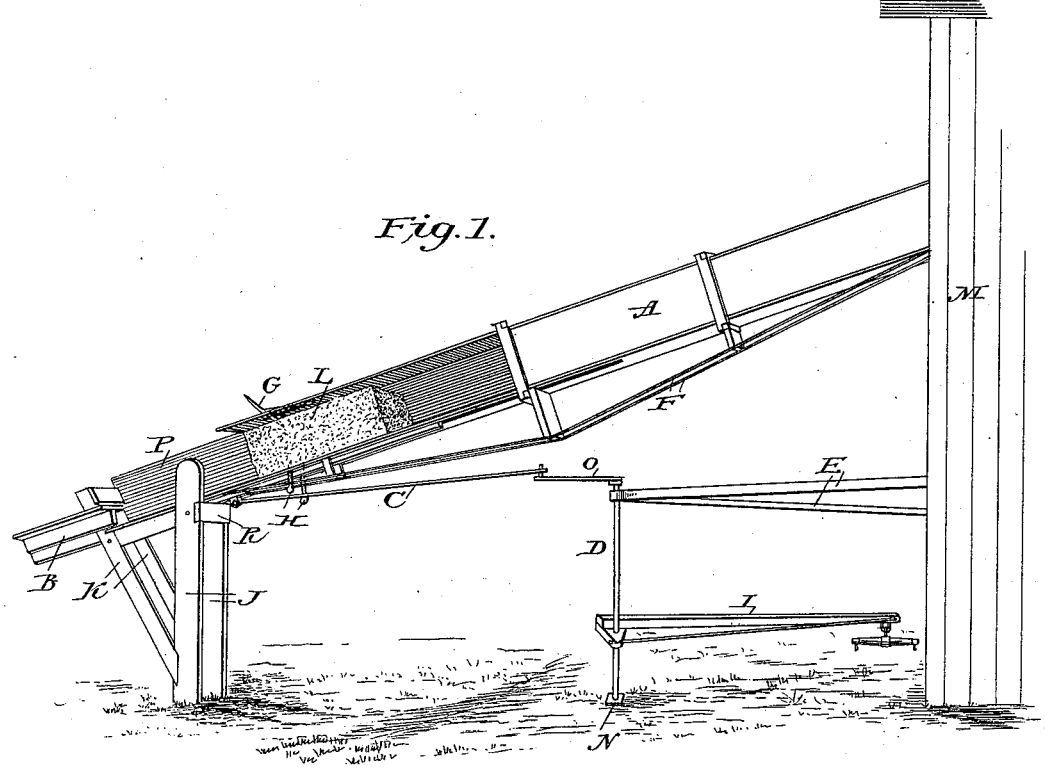
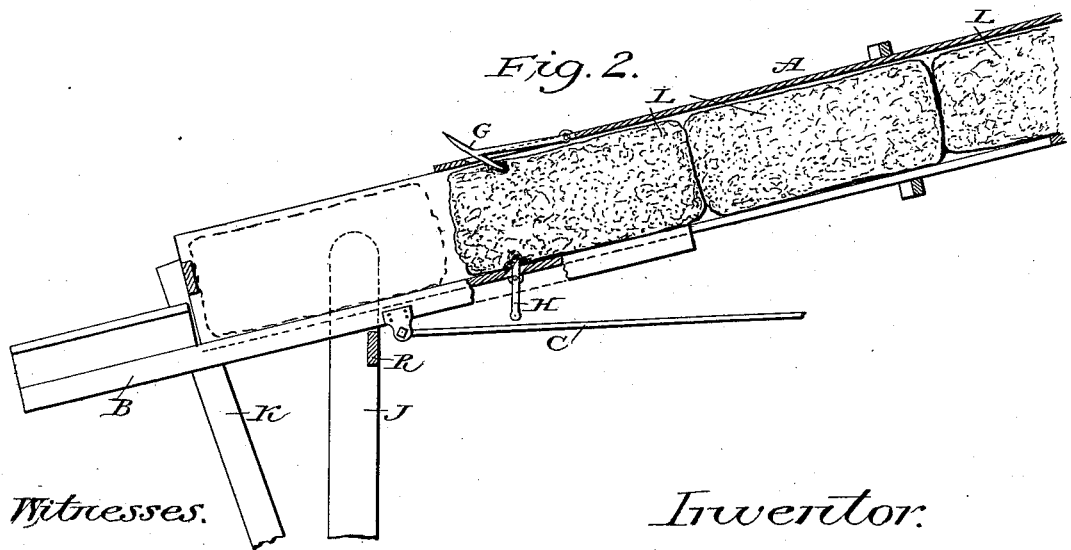
Witnesses.
Thomas McGannon
Ben Jenkins
Inventor.
Thomas F. Meath

UNITED STATES PATENT OFFICE.

THOMAS F. MEATH, OF HUMBOLDT, KANSAS.

BALE-ELEVATOR.

SPECIFICATION forming part of Letters Patent No. 569,976, dated October 20, 1896.

Application filed August 7, 1895. Serial No. 558,569. (No model.)

*To all whom it may concern:*

Be it known that I, THOMAS F. MEATH, a citizen of the United States, and a resident of Humboldt, in Allen county, State of Kansas, have invented a new and useful Bale-Elevating Machine, of which the following is a specification.

Heretofore in storing away baled hay or other baled material the bales were carried to the place desired by hand or were drawn up by means of ropes and pulleys, each of which process was slow and difficult.

The object of my invention is to facilitate the work of storing away baled hay or other material by rapidly elevating the bales through a chute, by means of horse-power, to place desired. I attain this object by the use of the machine illustrated in the accompanying drawings and described below.

Figure 1 is a lateral view of the machine complete, except two boards removed from right side of lower end of chute; Fig. 2, a view representing chute and bales as divided longitudinally into halves, with right half removed, also showing position of plunger and retainers and connection of plunger with pitman-rod.

Similar letters refer to similar parts throughout the several views.

The chute A, supported in middle by two stay-rods F F, two posts J J, and braces K K, constitute the principal framework of the machine. The posts J J are fastened firmly in the ground, and the lower end of chute A rests on posts J J, and upper end of chute is fastened to and extends to and into the barn or shed M and may be extended from one end to the other or to any part of it. Upright shaft D, with lever I attached and arm O at top, is set in a hole in block N, which is set firmly in the ground and is supported at top by two wooden braces E E, which are attached to barn or shed M. Pitman-rod C connects arm O with plunger B. (Better shown in Fig. 2.)

Plunger B slides or works on cross-bar R at top of posts J J, and in groove in first and second cross-bars on bottom of chute. The block on lower end of plunger extends through bottom of chute and slides on upper surface of bottom of a chute. As shaft D and arm O are made to turn by a horse hitched to lever I, plunger B is pulled forward or upward by pitman-rod C, and as arm O revolves on around plunger is pushed back to position, as shown in Fig. 1, and at each revolution of arm O plunger B makes a forward and backward movement.

While plunger is in position, as shown in Fig. 1, a bale is dropped into chute at open space P at top of lower end of chute, and as plunger is pulled forward or upward the bale is pushed upward in chute to position, as shown by bale L in Fig. 1, and is held from slipping back by retainers G at top of chute and H H at bottom of chute. At each consecutive downward or backward movement of plunger another bale is dropped into chute and pushed upward by plunger, it pushing bales preceding it up farther in chute, as shown by bales L L L in Fig. 2, and finally pushing them to place desired.

What I claim as my invention, and desire to secure by Letters Patent, is—

1. The bale-elevating machine, having a chute A and reciprocating plunger B and retainers G, and H, H, to prevent backward movement of the bales, substantially as set forth.

2. The combination, in bale-elevating machines, of a chute A with reciprocating plunger B, connected with rotating shaft D by pitman-rod C and arm O, substantially as set forth.

THOMAS F. MEATH.

Witnesses:
GEO. W. ERNST,
L. G. ERNST.